US009175397B2

(12) United States Patent
Hammond et al.

(10) Patent No.: US 9,175,397 B2
(45) Date of Patent: Nov. 3, 2015

(54) MULTILAYER HETEROSTRUCTURES AND THEIR MANUFACTURE

(75) Inventors: Scott R. Hammond, Golden, CO (US); Matthew Reese, Golden, CO (US); Benjamin Rupert, Berkeley, CA (US); Alexander Miedaner, Boulder, CO (US); Calvin Curtis, Golden, CO (US); Dana Olson, Golden, CO (US); David S. Ginley, Evergreen, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 624 days.

(21) Appl. No.: 13/048,251

(22) Filed: Mar. 15, 2011

(65) Prior Publication Data

US 2011/0223433 A1 Sep. 15, 2011

Related U.S. Application Data

(60) Provisional application No. 61/314,022, filed on Mar. 15, 2010.

(51) Int. Cl.

| | |
|---|---|
| ***B32B 9/04*** | (2006.01) |
| ***B05D 3/00*** | (2006.01) |
| ***B05D 3/02*** | (2006.01) |
| ***B05D 1/38*** | (2006.01) |
| ***B05D 1/36*** | (2006.01) |
| ***B32B 27/06*** | (2006.01) |
| ***B82Y 40/00*** | (2011.01) |
| ***C23C 18/12*** | (2006.01) |
| ***B05D 7/22*** | (2006.01) |
| ***B05D 7/04*** | (2006.01) |
| ***B05D 7/00*** | (2006.01) |
| *B05D 7/02* | (2006.01) |

(52) U.S. Cl.

CPC .............. *C23C 18/1216* (2013.01); *B05D 1/38* (2013.01); *B05D 3/0254* (2013.01); *B05D 7/04* (2013.01); *B05D 7/22* (2013.01); *B05D 7/52* (2013.01); *C23C 18/12* (2013.01); *C23C 18/1225* (2013.01); *C23C 18/1233* (2013.01); *C23C 18/1295* (2013.01); *B05D 7/02* (2013.01); *B05D 2350/60* (2013.01)

(58) Field of Classification Search

CPC .................................. C23C 18/12; B05D 7/22

USPC ....................................................... 427/407.1

See application file for complete search history.

(56) References Cited

U.S. PATENT DOCUMENTS

| | | | | |
|---|---|---|---|---|
| 5,132,140 | A | 7/1992 | Goda et al. | |
| 5,776,254 | A * | 7/1998 | Yuuki et al. | 118/725 |
| 7,208,872 | B2 | 4/2007 | Miyadera | |
| 7,535,017 | B2 | 5/2009 | Wittmann et al. | |
| 2010/0089636 | A1 | 4/2010 | Ramadas et al. | |

FOREIGN PATENT DOCUMENTS

| | | | |
|---|---|---|---|
| WO | 2010140980 | A1 | 12/2010 |
| WO | WO 2010/140980 | A1 * | 12/2010 |

OTHER PUBLICATIONS

Leterrier et al., “Mechanical Properties of transparent functional thin films for flexible displays,” Society of Vacuum Coaters, 46th Annual Technical Conference Proceedings, 2003, 6 pages.*

Meyers et al., “Aqueous Inorganic Inks for Low-Temperature Fabrication of ZnO TFTs,” J. Am. Chem. Soc., 2008, 130, 17603-17609.*

Wu et al., “Assembly of Conducting Polymer/Metal Oxide Multilayer in One Step”, Synthetic Metals 102 (1999) pp. 1268-1269.

Lewis et al., “Thin-Film Permeation-Barrier Technology for Flexible Organic Light-Emitting Devices”, IEEE Journal of Selected Topics in Quantum Electronics, vol. 10, No. 1, Jan./Feb. 2004.

Leterrier et al., “Mechanical Properties of Transparent Functional Thin Films for Flexible Displays”, 2003 Society of Vacuum Coaters 505/856-7188, 46th Annual Technical Conference Proceedings (2003) ISSN 0737-5921.

Graff et al., “Mechanisms of Vapor Permeation Through Multilayer Barrier Films: Lag Time Versus Equilibrium Permeation”, J. Appl. Phys., vol. 96, No. 4, Aug. 15, 2004.

Erler et al., “Multi Layer Materials for the Encapsulation of Thin Film Modules”, 3rd World Conference on Photovoltaic Energy Conversion, May 11-18, 2003, Osaka, Japan.

Weaver, et al., “Organic light-emitting devices with extended operating lifetimes on plastic substrates,” Applied Physics Letters, vol. 81, No. 16, Oct. 14, 2002, pp. 2929-2931.

Hu et al., “Low-temperature preparation of photocatalytic TiO2 thin films from anatase sols,” Journal of Crystal Growth, vol. 274, No. 3-4, Jun. 3, 2005, pp. 563-568.

Campaniello, et al., “Preparation of textured alumina films by the sol-gel route,” Journal Material Research, vol. 10, No. 2, Feb. 1995, pp. 297-301.

(Continued)

*Primary Examiner* — William Phillip Fletcher, III

(74) *Attorney, Agent, or Firm* — John C. Stolpa; Michael A. McIntyre

(57) ABSTRACT

A method of synthesizing multilayer heterostructures including an inorganic oxide layer residing on a solid substrate is described. Exemplary embodiments include producing an inorganic oxide layer on a solid substrate by a liquid coating process under relatively mild conditions. The relatively mild conditions include temperatures below 225° C. and pressures above 9.4 mb. In an exemplary embodiment, a solution of diethyl aluminum ethoxide in anhydrous diglyme is applied to a flexible solid substrate by slot-die coating at ambient atmospheric pressure, and the diglyme removed by evaporation. An $AlO_x$ layer is formed by subjecting material remaining on the solid substrate to a relatively mild oven temperature of approximately 150° C. The resulting $AlO_x$ layer exhibits relatively high light transmittance and relatively low vapor transmission rates for water. An exemplary embodiment of a flexible solid substrate is polyethylene napthalate (PEN). The PEN is not substantially adversely affected by exposure to 150° C.

22 Claims, 2 Drawing Sheets

(56) References Cited

OTHER PUBLICATIONS

George, et al., "Surface Chemistry for Atomic Layer Growth," Journal of Physical Chemistry, vol. 100, No. 31, Aug. 1, 1996, pp. 13121-13131.

Yin et al., "Mild solution synthesis of zinc oxide filmswith superhydrophobicity and superdydrophilicity," Journal Material Chemistry, vol. 15, No. 42, Nov. 21, 2005, pp. 4584-4587.

Erlat, et al., "SiO Gas Barrier Coatings on Polymer Substrates: Morphology and Gas Transport Considerations" Journal of Physical Chemistry, vol. 103, No. 29, Jul. 22, 1999, pp. 6047-6055.

Nisato, et al., "Evaluating High Permformance Diffusion Barriers: the Calcium Test", 21st Annual Asia Desplay, 8th Internaitonal Display Workshop, Nagoya, Japan, Oct. 2001.

Meyers, et al., "Aqueous Inorganic Inks for Low-Temperature Fabrication of ZnO TFTs", Journal of American Chemical Society, vol. 130, Issue 51, Dec. 24, 2008, pp. 17603-17609.

* cited by examiner

MULTILAYER HETEROSTRUCTURES AND THEIR MANUFACTURE

CROSS-REFERENCE TO RELATED APPLICATIONS

This application claims the benefit of U.S. Provisional Application No. 61/314,022, filed Mar. 15, 2010, which is incorporated herein by reference in its entirety. U.S. patent application Ser. No. 12/842,770, represented in U.S. Patent Application Publication No. 2011/0018563, published Jan. 27, 2011 and titled TEST DEVICE FOR MEASURING PERMEABILITY OF A BARRIER MATERIAL, is also incorporated herein by reference in its entirety

CONTRACTUAL ORIGIN

The United States Government has rights in this invention under Contract No. DE-AC36-08GO28308 between the United States Department of Energy and the Alliance for Sustainable Energy, LLC, the Manager and Operator of the National Renewable Energy Laboratory.

BACKGROUND

High performance barriers to molecular oxygen ($O_2$) and water are beneficial for some products or processes. For instance, organic and thin film photovoltaics (PV) and organic light emitting devices (OLED) require encapsulation by barriers that are highly resistant to transmission of $O_2$ and water. For PV and OLED applications, barriers must also permit transmittance of relatively high proportions of visible light, in addition to exhibiting relatively high resistance to $O_2$ and water transmission.

Heterostructures comprising layers of metal oxides deposited on substrates show promise as high performance $O_2$ and water barriers. However, the metal oxide layers are typically deposited on the substrates by known low pressure deposition processes such as atomic layer deposition, chemical vapor deposition, and physical vapor deposition.

The known low pressure deposition processes typically require pressure below 1 millibar (mb) and usually below $1\times10^{-3}$ mb, and also usually require relatively high temperatures that are incompatible with some polymers. The known low pressure deposition processes thus tend to be relatively expensive, slow, and incompatible with some organic polymers, which limits the utility of the low pressure deposition processes for some applications.

The foregoing examples of related art and limitations related therewith are intended to be illustrative and not exclusive. Other limitations will become apparent to those of skill in the art upon a reading or study of related art disclosure.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DETAILED DESCRIPTION

Figure 1:
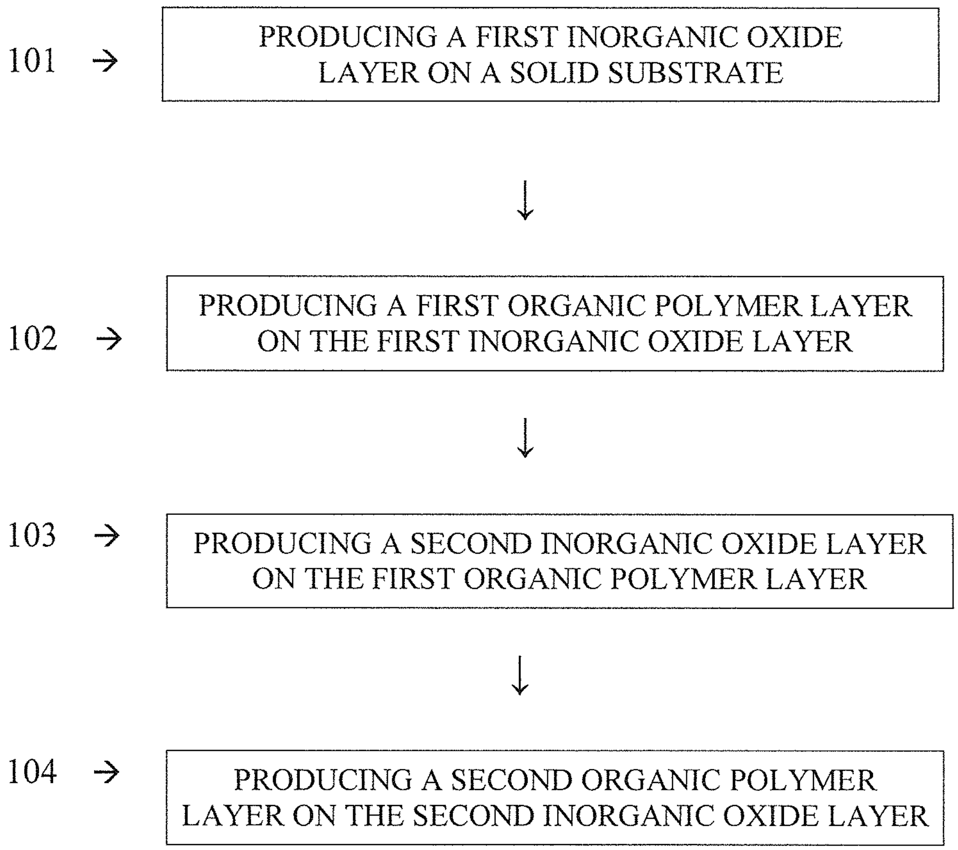
FIG. 1 is a flow chart illustrating an exemplary embodiment of a method of making a multilayer heterostructure.

Exemplary embodiments include multilayer heterostructures comprising two or more dissimilar layers. Embodiments of the two or more dissimilar layers comprise a metal oxide or silicon oxide (collectively referred to as inorganic oxide) layer deposited on a solid substrate by a liquid coating process under mild conditions. The solid substrate comprises a composition of matter in solid phase, and is typically, but not necessarily, a sheet or strip comprising an organic polymer. Examples of solid substrates include, but are not limited to, a solid phase material comprising an organic polymer, a polyethylene napthalate (PEN) web, a solid phase material comprising an inorganic oxide, an OLED or component thereof, or a PV device or component thereof. In some embodiments, a multilayer heterostructure is flexible at 20° C., being capable bending 90° around a curve having a radius of about 3.0 inches without apparent fracturing. Exemplary embodiments of solid substrates are flexible at 20° C., being capable of bending 90° around a curve having a radius of about 0.50 inch without apparent fracturing. Apparent fracturing is assessed by optical profilometry, optical microscopy, or scanning electron microscopy. Embodiments include examples where an organic polymer layer is applied to a solid substrate, followed by application of inorganic oxide.

The mild conditions include process pressures around ambient atmospheric pressure and temperatures around 150° C. Some embodiments of multilayer heterostructures comprise multiple inorganic oxide layers or multiple organic polymer layers. Embodiments including liquid coating processes under mild conditions enable relatively low cost, high throughput production of multilayer heterostructures exhibiting relatively high resistance to water vapor penetration. Water vapor and $O_2$ permeability tend to correlate, and thus barriers exhibiting low water permeability also typically exhibit low $O_2$ permeability.

Exemplary embodiments include a solution comprising an organometallic compound dissolved in a complexing solvent such as, but not limited to, diethylene glycol dimethyl ether (diglyme) or tetrahydrofuran (THF). Ethereal oxygens of the diglyme or THF typically stabilize the organometallic compound by forming a coordination complex with a reactive metal center of the organometallic compound.

Exemplary embodiments include an inorganic oxide layer formed on a flexible solid substrate by a liquid coating process. In an example, a solution of diethylaluminum ethoxide ($Et_2AlOEt$) dissolved in anhydrous diglyme is applied to the flexible solid substrate by roll-to-roll, slot-die coating, and the diglyme is substantially removed by evaporation. The $Et_2AlOEt$ is an organometallic compound that reacts readily with water or other protic solvent. The diglyme is a complexing solvent that forms a coordination complex with the Al atom of the $Et_2AlOEt$. The anhydrous diglyme includes a water content of less than 50 ppm. Embodiments of solutions of organometallic compounds in complexing solvents can be effective with less than 1000 ppm water, more effective with less than 500 ppm water, still more effective with less than 100 ppm water, and most effective with less than 50 ppm water.

After application of the $Et_2AlOEt$/diglyme solution to the flexible solid substrate, formation of an inorganic oxide layer comprising $AlO_x$ is facilitated by curing material remaining on the flexible solid substrate at a relatively low oven temperature of approximately 150° C. Embodiments include $AlO_x$ that is cured at an oven temperature of 110° C. An exemplary embodiment of a flexible solid substrate is PEN. The PEN is typically not adversely affected by exposure to 150° C.

In another exemplary embodiment, a polymethylsilsesquiloxane prepolymer solution such as, but not limited to, Filmtronics FG65 spin-on glass can be used to produce an inorganic oxide layer comprising $SiO_x$. The polymethylsilsesquiloxane prepolymer solution is air stable, abrogating a requirement for processing under inert gas. Accordingly, the polymethylsilsesquiloxane prepolymer solution is shelf stable for relatively long-term storage (6 months) at about 10° C. After deposition, a film comprising polymethylsilsesquiloxane prepolymer can be cured at oven temperatures of approximately 150° C. to generate a dense inorganic oxide layer comprising $SiO_x$. Although the inorganic oxide layer is typically not fully cured at an oven temperature of 150° C., complete curing is not required. Incomplete curing at 150° C. can be adequate to produce a multilayer heterostructure having desirable light transmittance and water permeability properties. In some embodiments, curing at oven temperatures greater than or less than 150° C. is performed.

Exemplary embodiments include multilayer heterostructures in which inorganic oxide layers are separated by organic polymer layers. It is believed that the organic polymer layer enhances resistance of the multilayer heterostructure to water vapor permeation by decoupling defects in the separated inorganic oxide layers. In some embodiments, the organic polymer layers consist essentially of polymethylmethacrylate (PMMA), the PMMA being deposited by a liquid coating process on an $AlO_x$ layer, the $AlO_x$ layer having been deposited by a liquid coating process on PEN or other solid substrate. Accordingly, a multilayer heterostructure comprising multiple $AlO_x$/PMMA dyads can be created, the $AlO_x$/PMMA dyads including an $AlO_x$ layer created by a liquid coating process and a PMMA layer created by a liquid coating process.

Exemplary embodiments include inorganic oxide layers produced under mild conditions. Mild conditions typically comprise process pressures that are sometimes between approximately 800 and 2000 mb, more often greater than 475 mb, still more often greater then 87 mb, and most often greater than 9.4 mb. Process pressures refer to gas pressures surrounding described processes, rather than to pressures applied to solutions or blends for purposes of applying or spraying the solutions or blends. For instance, where a solution is applied to a solid substrate by slot-die coating at a process pressure of about 800 mb, the gas pressure surrounding the solid substrate and slot-die apparatus is about 800 mb. It is understood that the solution can be at a higher pressure than the process pressure in order to facilitate flow of the solution through an orifice.

In some embodiments, the mild conditions comprise temperatures that are sometimes approximately 110° C. or less, more often approximately 150° C. or less, still more often less than 175° C., and most often less than 225° C.

Either or both of solid substrates and organic polymer layers can comprise organic polymers. Examples of organic polymers include, but are not limited to:

- polyesters including, but not limited to, polyethylene naphthalate (PEN) and polyethylene terephthalate (PET);
- polyvinyl acetals including, but not limited to, polyvinyl butyral;
- acrylonitrile butadiene styrene (ABS);
- polyacrylonitrile;
- polystyrene;
- polyetheretherketone (PEEK);
- polyimides;
- polyamides;
- polycarbonates;
- epoxide polymers;
- gettering polymers including, but not limited to, poly (tolylene-2,4-diisocyanate);
- polyvinyl chloride;
- polyaniline;
- acrylate or methacrylate polymers including, but not limited to, poly(methylmethacrylate) (PMMA);
- poly(vinylidene chloride-co-acrylonitrile-co-methylmethacrylate);
- fluorinated polymers including, but not limited to, polytetrafluoroethylene, polyfluoroethylenepropylene, poly (tetrafluoroethylene-co-hexafluoropropylene-co-vinylidene fluoride, and polyvinylidene fluoride;
- polychloropene;
- polyisoprenes;
- polyolefins including, but not limited to, polyethylene (PE), polypropylene (PP) and polybutylene (PB);
- bisphenol A polymers including, but not limited to, poly (Bisphenol A-co-epichlorohydrin); and
- polyurethanes.

TERMINOLOGY

The terms and phrases as indicated in quotation marks (“ ”) in this section are intended to have the meaning ascribed to them in this Terminology section applied to them throughout this document, including in the claims, unless clearly indicated otherwise in context. Further, as applicable, the stated definitions are to apply, regardless of the word or phrase’s case, to the singular and plural variations of the defined word or phrase.

The term “or” as used in this specification and the appended claims is not meant to be exclusive; rather the term is inclusive, meaning either or both.

References in the specification to “one embodiment”, “an embodiment”, “another embodiment, “a preferred embodiment”, “an alternative embodiment”, “one variation”, “a variation” and similar phrases mean that a particular feature, structure, or characteristic described in connection with the embodiment or variation, is included in at least an embodiment or variation. The phrase “in one embodiment,” “in one variation” or similar phrases, as used in various places in the specification, are not necessarily meant to refer to the same embodiment or the same variation.

The term “approximately” as used in this specification and appended claims, refers to plus or minus 10% of the value given.

The term “about” as used in this specification and appended claims, refers to plus or minus 20% of the value given.

The terms “generally” and “substantially” as used in this specification and appended claims, mean mostly, or for the most part.

The term “complexing solvent” as used in this specification and appended claims, refers to a solvent that acts as a Lewis base to donate an electron pair to a metal atom or silicon atom, thereby forming a coordination complex. The metal atom or silicon atom with which the complexing solvent forms a coordination complex typically, but not necessarily, resides in an organometallic compound or organosilicon compound, respectively. A complexing solvent includes a covalently bound atom such as an oxygen atom or nitrogen atom that has a donor electron pair. Examples of complexing solvents include, but are not limited to, diethyl ether, tetrahydorfuran, and diglyme, wherein an ethereal oxygen atom forms a coordination complex with a Lewis acid. The aluminum atom residing in the organometallic compound $Et_2AlOEt$ exemplifies a Lewis acid that forms a coordination complex with an ethereal oxygen. Other complexing solvents such as, but not limited to, pyridine, acetonitrile, and tetramethylethylenediamine, include a nitrogen atom that can act as the electron pair donor to form a coordination complex with a metal atom or a silicon atom.

The term "organometallic compound" as used in this specification and appended claims, refers to a compound comprising molecules in which a metal atom is covalently bound directly to a carbon atom. Organometallic compounds typically react readily with water or other protic solvent. Examples of organometallic compounds include, but are not limited to, $Et_2AlOEt$, diethyl zinc, and titanium diisopropoxide. For the purposes of this specification and appended claims, an inorganic oxide is not considered an organometallic compound, even though the inorganic oxide may contain some metal atoms covalently bonded to carbon atoms by virtue of incompletely reacted organometallic compound from which the inorganic oxide is formed.

The term "inorganic oxide" as used in this specification and appended claims, refers to a compound characterized by chains of alternating covalently bound oxygen and inorganic atoms, the inorganic atoms being metal atoms or silicon atoms. An inorganic oxide can be represented by general formula $InorgO_x$. Where the inorganic atom is a metal, the inorganic oxide can be referred to as a metal oxide, and can be represented by the formula $MO_x$. Examples of inorganic oxides include metal oxides such as titanium oxide ($TiO_x$), aluminum oxide ($AlO_x$), zinc oxide ($ZnO_x$), tin oxide ($SnO_x$), and indium-zinc oxide ($InZnO_x$). Another example of an inorganic oxide is silicon oxide ($SiO_x$). An inorganic oxide can include some metal to carbon covalent bonds or silicon to carbon covalent bonds when the inorganic oxide is incompletely "cured."

The terms "cure," "cured," "cures," and similar terms, as used in this specification and appended claims, refers to reaction of a organometallic compound to form $MO_x$, or reaction of an organosilicon compound to form a $SiO_x$. A completely cured metal oxide comprises no metal to carbon covalent bonds from incompletely reacted organometallic compounds. A partially or incompletely cured metal oxide comprises some residual metal to carbon covalent bonds that result from incompletely reacted organometallic compounds. Where an inorganic oxide layer or inorganic oxide precursor is "cured" by treatment at a specified temperature, partial curing may result.

The term "liquid coating process" as used in this specification and appended claims, refers to a process wherein a first component is suspended, dissolved, or otherwise combined with a second component, the second component being a liquid, and the first component or a derivative thereof being deposited on or coating a substrate. Typically, but not necessarily, the first component is a solute dissolved in the second component, the second component being a solvent. The second component acts as a vehicle to deliver the first component to a substrate, whereupon the second component is removed from the first component by evaporation. Examples of liquid coating processes include, but are not limited to, slot-die coating, spin-casting, drop-casting, dip-coating, knife coating (also known as doctor blading), spray-coating, ink-jet printing, screen printing, Mayer rod coating (also known as metering rod coating), Gravure coating, Flexo printing, and curtain coating. Examples of a liquid coating process include, but are not limited to, processes wherein the first component is a solute dissolved in the second component, and the second component is a solvent that is removed from the first component by evaporation. Where the first component is a solute dissolved in the second component, the second component therefore being a solvent, the process is a species of liquid coating processes referred to as a "solution coating process."

The term "blend" as used in this specification and appended claims, refers to an intermingled combination of two or more components such as a suspension, emulsion, solution, or mixture.

The terms "flexible," "flexibility," and similar terms, as used in this specification and appended claims, refers to an article's physical property at 20° C., the physical property being a capability of bending a specified number of degrees around a curve of a specified radius.

Water Vapor Permeability

Water vapor permeability properties of exemplary embodiments of multilayer heterostructures comprising various inorganic oxide layers on solid substrates are shown in Table 1. Water vapor transmission lag time (Lag Time) and steady state water vapor transmission rate (WVTR) are assessed using an Electrical Ca Test described in U.S. patent application Ser. No. 12/842,770, represented in U.S. Patent Application Publication No. 2011/0018563, published Jan. 27, 2011 and titled TEST DEVICE FOR MEASURING PERMEABILITY OF A BARRIER MATERIAL, which is incorporated by reference, or by use of a Permatran-W® series or Aquatran WVTR analyzer from Mocon® (Minneapolis, Minn.). Values obtained by the Electrical Ca Test and the Permatran-W® or Aquatran instruments are generally equivalent. Other equivalent methods and instruments for assessing water vapor permeability are commonly known to persons skilled in the art. The multilayer hetero structures of Table 1, infra, do not include an organic polymer layer deposited on the inorganic oxide layer.

The solid substrates typically include PEN layers having a thickness of approximately 0.0030 inch or 0.0050 inch. Absent an inorganic oxide layer, uncoated PEN at approximately 0.0030 inch or 0.0050 inch thick, exhibits light transmittance greater than 80% at 431 nm to 600 nm and greater that 85% from 600 nm to 1000 nm. Addition of the inorganic oxide layers of Table 1 do not appreciably diminish light transmittance compared to uncoated PEN solid substrate, with all heterostructures of Table 1 also exhibiting light transmittance greater than 80% at 431 nm to 600 nm and greater than 85% between 600 nm and 1000 nm. Multilayer heterostructures comprising one or more inorganic oxide layers typically exhibit increased light transmittance over that exhibited by uncoated PEN or other uncoated solid substrates, probably due to the antireflective properties of the inorganic oxide layers. The increased light transmittance is generally more pronounced with multiple inorganic oxide layers, as compared to a single inorganic oxide layer.

The $AlO_x$ layers of Table 1 are produced from solutions of $Et_2AlOEt$ in THF or diglyme, deposited on the PEN substrate by roll-to-roll, slot-die coating, with curing at an oven temperature of 150° C. $AlO_x$ layers 100 nm or more thick are not reported because they tend to crack. Conversely, $AlO_x$ layers below 100 nm thick are smooth and apparently free of fractures, with surface roughness (Ra) values of approximately 1.4-1.9 nm. Among the multilayer heterostructures of Table 1, two adjacent 25 nm $AlO_x$ layers outperform the other inorganic oxide layers with respect to resisting water permeation. Two adjacent inorganic oxide layers can be referred to individually as secondary inorganic oxide layers and collectively as a primary inorganic oxide layer.

$SiO_x$ layers of Table 1 are produced by spin-casting Filmtronics™ FG65 Spin-On-Glass on the PEN substrate with subsequent curing at an oven temperature of 150° C. $SiO_x$ layers are smooth and free of fractures when analyzed by optical profilometry, with Ra values of approximately 1.6-2.3 nm.

TABLE 1

| $InorgO_x$ Layer | Thickness (nm) | Lag Time (hrs) | WVTR ($g/m^2 \cdot day$) |
|---|---|---|---|
| $AlO_x$ | 25 | 1.06 | 0.686 |
| $AlO_x$ | 50 | 30.0 | 0.369 |
| $AlO_x$ | 2 × 25 | 30.3 | 0.181 |
| $AlO_x$ | 2 × 50 | 1.13 | 0.788 |
| $SiO_x$ | 100 | 1.85 | 0.505 |
| $SiO_x$ | 200 | 1.18 | 0.560 |
| $SiO_x/AlO_x$ | 100/50 | 1.31 | 0.558 |

Exemplary Embodiments of Multilayer Heterostructure Methods of Manufacture

Example 1

An exemplary embodiment of making a multilayer heterostructure comprising an inorganic oxide layer and an organic polymer layer is provided in Example 1. The inorganic oxide layer and the organic polymer layer of Example 1 comprise $AlO_x$ and polymethylmethacrylate (PMMA), respectively. The processes of Example 1 are carried out at about ambient atmospheric pressure. The ambient atmospheric pressure of Example 1 is about 821 mb. In other embodiments, the ambient atmospheric pressure can be above or below 821 mb, depending on altitude above sea level and other factors.

The $AlO_x$ layer of Example 1 is produced on a solid substrate consisting essentially of PEN, using a Mayer rod coating (a solution coating process), as follows: approximately 0.1 to 1.0 mL of 25% by weight $Et_2AlOEt$ in toluene is added to 20 mL anhydrous tetrahydrofuran (THF), and the solution thoroughly mixed under inert gas. The resulting $Et_2AlOEt$/THF solution, in which THF acts as a complexing solvent, is used within two days. Approximately 1 mL of the $Et_2AlOEt$/THF solution is deposited on a clean 0.0030 inch or 0.0050 inch thick PEN substrate and coated using a #3 Mayer rod in a controlled humidity chamber. The clean 0.0030 inch or 0.0050 inch thick PEN solid substrate is sufficiently flexible at 20° C. to make a 90° bend around a curve having a radius of 0.5 inch, without apparent fracturing. Apparent fracturing is assessed by optical profilometry, optical microscopy, or scanning electron microscopy.

The humidity of the controlled humidity chamber ranges from about 20% to about 75% relative humidity (RH). Water in the controlled humidity chamber facilitates the reaction of the $Et_2AlOEt$ to form $AlO_x$. The resulting film is cured in an oven for 10 minutes at an oven temperature of 150° C. to produce an $AlO_x$ layer. The $AlO_x$ layer typically, but not necessarily, has a relatively uniform thickness. Embodiments of $AlO_x$ layers typically range from 25 nm to 200 nm thick.

An organic polymer layer comprising PMMA is subsequently produced on the $AlO_x$ layer as follows: PMMA is dissolved at approximately 1% to 5% by weight in dichloromethane. 1 mL of the PMMA/dichloromethane solution is deposited on the $AlO_x$ layer and coated using a #3 Mayer rod to produce an organic polymer layer. The resulting multilayer heterostructure is treated in an oven at 150° C. for 10 minutes. Organic polymer layers of Example 1 are typically between 100 and 400 nm thick, and are often about 200 nm thick. The PMMA of Example 1 is merely exemplary; in some embodiments, other organic polymers are used.

In some embodiments the processes of Example 1 described above are repeated to produce $AlO_x$ layers separated by PMMA layers, thereby constructing multilayer heterostructures comprising multiple dyads, a dyad including an $AlO_x$ layer and an adjacent PMMA layer. The multilayer heterostructure of Example 1 comprising one or more dyads exhibits water vapor transmission rates (WVTR) as low as $1.1\times10^{-2}$ $g/m^2 \cdot day$ and a Lag Time of 6.9 hours at 45° C. and 85% RH. Lag Times and WVTR are assessed using an Electrical Ca Test described in U.S. patent application Ser. No. 12/842,770, represented in U.S. Patent Application Publication No. 2011/0018563, or by use of a Permatran-W® series or Aquatran WVTR analyzer.

Embodiments of the multilayer heterostructures of Example 1, comprising multiple dyads in which the inorganic oxide layers are less than 100 nm thick and the organic polymer layers are about 200 nm thick, are flexible at 20° C., being capable of bending 90° around a curve having a radius of about 3.0 inches without apparent fracturing of the inorganic oxide layer. Apparent fracturing is assessed by optical profilometry, optical microscopy, or scanning electron microscopy. When being capable of bending 90° around a curve having a radius without apparent fracturing, embodiments of multilayer heterostructures are effective where the radius is less than 5.0 inches, more effective where the radius is less than 4.0 inches, and most effective where the radius is less than about 3.0 inches.

Example 2

Example 2 is an exemplary embodiment of making a multilayer hetero structure comprising an inorganic oxide layer, a solid substrate, and an organic polymer layer. The inorganic oxide layer, the solid substrate, and the organic polymer layer of Example 2 comprise $AlO_x$, PEN, and polymethylmethacrylate (PMMA), respectively.

The method of making a multilayer hetero structure of Example 2 is illustrated in FIG. 1. The operations of Example 2 are carried out at about ambient atmospheric pressure, which is about 821 mb. In other embodiments, ambient atmospheric pressure can be above or below 821 mb, depending on altitude above sea level and other factors.

Referring to FIG. 1, in a first operation 101, an inorganic oxide layer is produced on a solid substrate using a liquid coating process. The first inorganic oxide layer consists essentially of $AlO_x$, and the solid substrate consists essentially of PEN. The solid substrate of Example 2 is flexible at 20° C., being capable of bending 90° around a 0.50 inch radius curve without apparent fracturing. Apparent fracturing is assessed by optical profilometry, optical microscopy, or scanning electron microscopy. The liquid coating process is roll-to-roll, slot-die coating. The first operation 101 proceeds as follows: 50 mL of a 25% by weight solution of $Et_2AlOEt$ in toluene is added to 200 mL of anhydrous diethylene glycol dimethyl ether (diglyme) and the solution thoroughly mixed under inert gas. The resulting $Et_2AlOEt$/diglyme solution, in which diglyme acts as a complexing solvent, is used within 2 weeks. The resulting $Et_2AlOEt$/diglyme solution is roll-to-roll coated on the solid substrate using a 12" slot-die supplied via syringe pump. The solid substrate is a clean 0.0030 inch thick PEN web. The flow rate is varied from 0.251 to 2.00 mL/min, and PEN web speed is varied from 3 to 5 ft/min. The coated PEN web is treated in an oven at an oven temperature of 150° C. to produce an $AlO_x$ layer having a relatively uniform thickness that resides in a range from 25 to 200 nm. The oven is a thermal convection oven equipped with additional infrared heaters. The coated web is subsequently rewound.

In a second operation 102, a first organic polymer layer is produced on the first inorganic oxide layer by a liquid coating process. The first organic polymer layer consists essentially of PMMA and the liquid coating process is slot-die coating.

The second operation 102 proceeds as follows: after being rewound, the $AlO_x$-coated PEN web is reloaded on the unwind and slot-die coated with 2% to 5% by weight PMMA in methyl ethyl ketone (MEK). The flow rate is varied from 0.258-1.03 mL/min and the web speed varied from 3-5 ft/min. The resulting multilayer heterostructure is heat treated in an oven at an oven temperature of 150° C., to produce a PMMA layer having a thickness ranging from 100 nm-400 nm. The oven is a thermal convection oven equipped with additional infrared heaters. In some embodiments, heat treatment of organic polymer layers is performed at oven temperatures greater than or less than 150° C.

In a third operation 103, a second inorganic oxide layer is produced on the first organic polymer layer by a liquid coating process. Like the first inorganic oxide layer, the second inorganic oxide layer consists essentially of $AlO_x$, and the liquid coating process is roll-to-roll, slot-die coating. The third operation 103 proceeds in a manner substantially similar to the first operation, except that the solution of $Et_2AlOET$ in diglyme is coated on the first organic layer of PMMA rather than on the PEN web.

In a fourth operation 104, a second organic polymer layer is produced on the second inorganic oxide layer by a liquid coating process. Like the first organic polymer layer, the second organic polymer layer consists essentially of PMMA and the liquid coating process is slot-die coating. The fourth operation 104 proceeds in a manner substantially similar to the second operation, with the PMMA/MEK solution being applied to an inorganic oxide layer consisting essentially of $AlO_x$.

In some embodiments, the processes of Example 2 are repeated to form multiple adjacent layers of $AlO_x$ and PMMA. One $AlO_x$ layer and one adjacent PMMA layer can be referred to collectively as a dyad, and multilayer heterostructures comprising up to five dyads or more can be created. In some embodiments, multiple adjacent $AlO_x$ layers are produced before adding an organic polymer layer. For example, exemplary embodiments comprising two adjacent 25 nm $AlO_x$ layers exhibit superior (lower) water vapor penetration compared to a single 50 nm $AlO_x$ layer. A multilayer heterostructure comprising multiple dyads, produced by the method of Example 2, exhibits a WVTR as low as $2.6\times10^{-3}$ g/m$^2$·day and a Lag Time of 100 hours, at 45° C. and 85% RH.

Embodiments of the multilayer heterostructures of Example 2, comprising multiple dyads in which the inorganic oxide layers are less than 100 nm thick and the organic polymer layers are about 200 nm thick, are flexible at 20° C., being capable of bending 90° around a curve having a radius of approximately 3.0 inches without apparent fracturing of the inorganic oxide layer.

Example 3

An exemplary embodiment of making a multilayer heterostructure comprising an inorganic oxide layer on a solid substrate is provided in Example 3. The inorganic oxide layer of Example 3 comprises $TiO_x$. The processes of Example 3 are carried out at about ambient atmospheric pressure. Ambient atmospheric pressure of Example 3 is about 821 mb.

The $TiO_x$ layer is produced on a solid substrate comprising PEN, using spin-casting (a liquid coating process), as follows: 1 mL of titanium diisopropoxide bis(acetylacetonate) is added to 20 mL of anhydrous THF and thoroughly mixed under inert gas. The resulting solution, in which THF acts as a complexing solvent, is 5% (v/v) titanium isopropoxide in THF. The titanium isopropoxide/THF solution is spin-cast at 600 rpm for 3 seconds followed by 60 seconds at 5000 rpm on clean PEN. The resulting film is treated in an oven at 150° C. for 10 minutes to produce a $TiO_x$ layer.

Example 4

An exemplary embodiment of making a multilayer heterostructure comprising an inorganic oxide layer on a solid substrate is provided in Example 4. The inorganic oxide layer of Example 4 comprises $ZnO_x$. The processes of Example 4 are carried out at about ambient atmospheric pressure. The ambient atmospheric pressure of Example 4 is about 821 mb.

The $ZnO_x$ layer is produced on a solid substrate using spin-casting (a liquid coating process) as follows: 6.45 mL of a 15% by weight solution of diethylzinc in toluene is added to 20 mL anhydrous THF and thoroughly mixed under inert gas to produce a 0.4 M solution of diethylzinc in THF. The diethylzinc/THF solution is spin-cast at 600 rpm for 3 seconds followed by 60 seconds at 5000 rpm on either clean PEN or on PEN coated with $SiO_x$. The resulting film is cured in an oven at an oven temperature of 150° C. for 10 minutes to produce a $ZnO_x$ layer.

Example 5

An exemplary embodiment of making a multilayer heterostructure comprising an inorganic oxide layer on a solid substrate is provided in Example 5. The inorganic oxide layer of Example 5 comprises $SiO_x$. The processes of Example 5 are carried out at about ambient atmospheric pressure (821 mb).

The $SiO_x$ layer is produced on a solid substrate using spin-casting (a liquid coating process), as follows: 1.0 g of tris (pentafluorophenyl)borane and 10 g of polydiethoxysiloxane are dissolved in 79 g of THF and thoroughly mixed. To the solution is added 10 g polymethylhydridosiloxane, and with further mixing to produce a siloxane polymer/THF solution containing 10% by weight polydiethoxysiloxane, 10% by weight polymethylhydridosiloxane, and 1% by weight tris (pentafluorophenyl)borane. The siloxane polymer/THF solution is spin-cast at 2000 rpm on either clean PEN substrate or PEN coated with bisphenol-A-co-epichlorohydrin and treated at an oven temperature of 150° C. for 10 minutes. The resulting $SiO_x$ layer is then spin-cast with a solution of 5% by weight PMMA in THF (spun at 2000 rpm) and cured at an oven temperature of 150° C. for 10 minutes.

In some embodiments, the processes of Example 5 described above are repeated to produce alternating layers of $SiO_x$ and PMMA, thereby constructing hetero structures comprising two dyads, a dyad including an $SiO_x$ layer and an adjacent PMMA layer. The multilayer heterostructure of Example 5, comprising two dyads, exhibits a water vapor transmission rate (WVTR) as low as $0.145\times10^{-2}$ g/m$^2$·day and a Lag Time of 13.8 hours at 65° C. and 85% RH.

Example 6

An exemplary embodiment of making a multilayer heterostructure comprising an inorganic oxide layer on a solid substrate is provided in Example 6. The inorganic oxide layer of Example 6 comprises $SiO_x$. The processes of Example 6 are carried out at about ambient atmospheric pressure (821 mb).

The $SiO_x$ layer is produced on a solid substrate using spin-casting (a liquid coating process) as follows: Filmtronics™ FG65 Spin-On-Glass is spin-cast at 600 rpm for 3 seconds, followed by 60 seconds at 2000 rpm, on clean PEN. The resulting film is treated at an oven temperature of 150° C. for 10 minutes to produce an $SiO_x$ layer. The $SiO_x$ layer is then spin-coated with 5% by weight poly(tolyene-2,4,-diisocyanate) in ethyl acetate and butyl acetate, at 600 rpm for 3 seconds and 2000 rpm for 60 seconds, and treated at an oven temperature of 150° C. for 10 minutes.

In some embodiments, the processes of Example 6 described above are repeated to produce multiple dyads, each dyad comprising an $SiO_x$ layer adjacent to a poly(tolyene-2, 4,-diisocyanate) layer. The multilayer heterostructure of Example 6, comprising multiple dyads, exhibits a WVTR as low as 0.132 $g/m^2$·day and a Lag Time of 11.8 hours at 65° C. and 85% RH.

Example 7

An exemplary embodiment of making a heterostructure comprising a layer of $ZnO_x$ on a solid substrate is provided in Example 7. The $ZnO_x$ layer is produced on a solid substrate as follows: An amino-hydroxo zinc precursor is prepared according to the method reported in: S. T. Meyers, J. T. Anderson, C. M. Hung, J. Thompson, J. F. Wager, D. A. Keszler *J. Am. Chem. Soc.* 2008, 130, 17603-17609. An isopropanol-diluted solution (~40% v/v isopropanol, 5.3 M $NH_3$ (aq), 0.056 M Zn) is ultra-sonically sprayed onto $O_2$-plasma cleaned PEN substrate at 90° C.; 10 coats at a pump speed of 2.5 rpm. A resulting film is then cured for 10 minutes at an oven temperature of 150° C. to produce a $ZnO_x$ layer. The processes of Example 7 are carried out at about ambient atmospheric pressure. Ambient atmospheric pressure of Example 7 is about 821 mb. In other embodiments, ambient atmospheric pressure can be above or below 821 mb, depending on altitude above sea level and other factors.

A First Embodiment Multilayer Heterostructure

Figure 2:
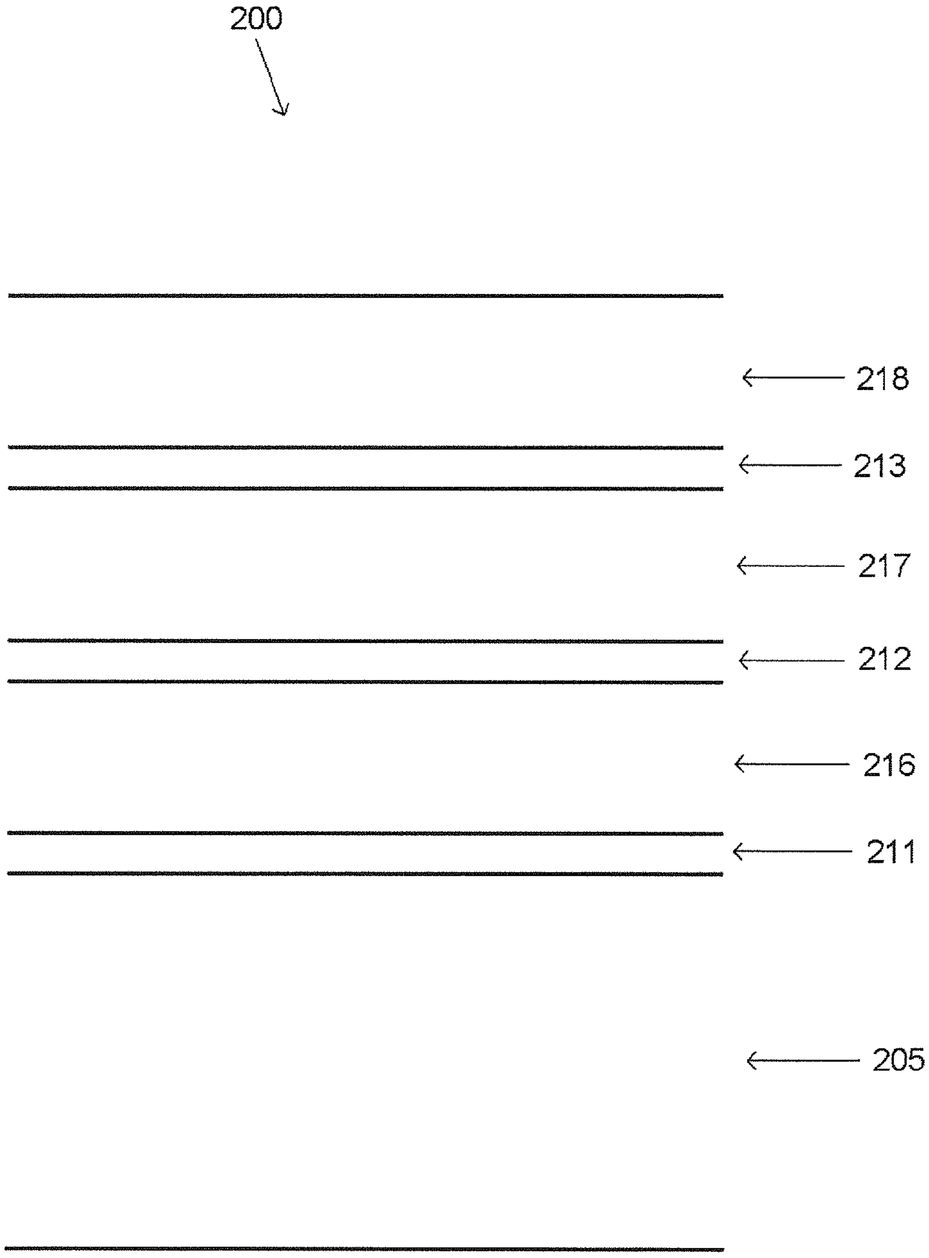
FIG. 2 is a schematic representation of an exemplary embodiment of a multilayer heterostructure.

A schematic representation of a first embodiment multilayer heterostructure 200 is illustrated in FIG. 2. FIG. 2 is not drawn to scale. The first embodiment multilayer heterostructure comprises a PEN substrate 205 on which reside primary inorganic oxide layers 211, 212, 213 and organic polymer layers 216, 217, 218. Adjacent primary inorganic oxide layers and organic polymer layers can be referred to as a dyad, and the first embodiment multilayer heterostructure therefore comprises three dyads residing on a PEN substrate.

The PEN substrate 205 of the first embodiment is approximately 0.0030 inch thick. In other embodiments, a thickness of the substrate can be greater or less than 0.0030 inch. A first primary inorganic oxide layer 211 is approximately 50 nm thick and consists essentially of $AlO_x$ produced from a solution of $Et_2AlOEt$ in diglyme. The solution of $Et_2AlOEt$ in diglyme is applied to the PEN substrate by slot-die coating. Diglyme is substantially removed by evaporation and the nascent first embodiment heterostructure is treated at an oven temperature of 150° C. to leave a secondary layer of $AlO_x$ approximately 25 nm thick. The process is repeated to produce another secondary 25 nm $AlO_x$ layer. The two secondary $AlO_x$ 25 nm layers together constitute the first primary inorganic oxide layer 211.

A first organic polymer layer 216 is approximately 200 nm thick and comprises a PMMA layer produced from a solution of 3% by weight PMMA in MEK. The PMMA/MEK solution is applied to the first primary inorganic oxide layer by slot-die coating, and the resulting film is heat treated in a 150° C. oven to produce the PMMA layer.

A second primary inorganic oxide layer 212 is added to the nascent first embodiment heterostructure 200 by a process substantially similar to that of the first primary inorganic oxide layer 211. Accordingly, the second primary inorganic oxide layer is approximately 50 nm thick and comprises two adjacent secondary 25 nm $AlO_x$ layers. The second primary inorganic oxide layer resides adjacent to the first organic polymer layer 216.

A second organic polymer layer 217 is added to the nascent first embodiment heterostructure 200 by a process substantially similar to that of the first organic polymer layer 216. Accordingly, the second organic polymer layer is approximately 200 nm thick and comprises a PMMA layer. The second organic polymer layer resides adjacent to the second primary inorganic oxide layer 212.

A third primary inorganic oxide layer 213 is added by a process substantially similar to that of the first and second primary inorganic oxide layers 211, 212. Accordingly, the third primary inorganic oxide layer is approximately 50 nm thick and comprises two adjacent secondary 25 nm $AlO_x$ layers.

A third organic polymer layer 218 is added by a process substantially similar to that of the first and second organic polymer layers 216, 217. Accordingly, the third organic polymer layer is approximately 200 nm thick and comprises a PMMA layer. The third organic polymer layer resides adjacent to the third primary inorganic oxide layer 213.

The first embodiment multilayer heterostructure 200, comprising three $AlO_x$/PMMA dyads and a PEN substrate, is merely exemplary. Other embodiments comprise different substrates, different inorganic oxide layers, and different organic polymer layers. Further, other embodiments can comprise a greater or lesser number of dyads.

Alternative Embodiments and Variations

The various embodiments, examples, and variations thereof, illustrated in the accompanying Figures and/or described above, are merely exemplary and are not meant to limit the scope of the appended patent claims. It is to be appreciated that numerous other embodiments and variations have been contemplated, as would be obvious to one of ordinary skill in the art, given the benefit of this disclosure. All embodiments and variations that read upon appended claims are intended and contemplated to be within the scope of the invention.

We claim:

1. A method comprising:

providing an organometallic solution, the organometallic solution including an organometallic compound dissolved in a complexing solvent;

distributing the organometallic solution on a solid substrate, wherein the solid substrate comprises an organic polymer and the distributing is by a first liquid coating process;

removing the complexing solvent; and curing the organometallic compound to form a metallic oxide from the organometallic compound, wherein the metallic oxide produces a first metal oxide layer on the solid substrate.

wherein the distributing is by a liquid coating process.

2. The method of claim 1, wherein the organometallic solution includes a water content of less than 500 ppm.

3. The method of claim 1, wherein the solid substrate is flexible at 20° C., being capable of bending 90° around a curve having a radius of 0.5 inch or less without apparent fracturing.

4. The method of claim 1, wherein the distributing, the removing, and the curing are performed at a temperature under 225° C. and a processing pressure greater than 9.4 mb.

5. The method of claim 4, wherein the processing pressure is greater than 475 mb.

6. The method of claim 4, wherein the processing pressure is greater than 800 mb.

7. The method of claim 1, wherein the distributing, the removing, and the curing are performed at about ambient atmospheric pressure.

8. The method of claim 7, wherein the distributing, the removing, and the curing are performed at a temperature of 225° C. or less.

9. The method of claim 8, further comprising producing a first organic polymer layer on the first metal oxide layer by a second liquid coating process.

10. The method of claim 9, wherein the second liquid coating process for producing the first organic polymer layer comprises:

providing an organic polymer solution, the organic polymer solution including an organic polymer dissolved in an organic solvent;

distributing the organic polymer solution on the first metal oxide layer at a process pressure of about ambient atmospheric pressure; and removing the organic solvent.

11. The method of claim 10, further comprising distributing the organometallic solution on the first organic polymer layer and producing a second metal oxide layer on the first organic polymer layer.

12. The method of claim 10, wherein the organic polymer layer comprises polymethylmethacrylate and the organic solvent comprises at least one of dichloromethane, methyl ethyl ketone, or ethyl acetate.

13. The method of claim 1, wherein the organometallic compound comprises a Lewis acid and the complexing solvent comprises a Lewis base.

14. The method of claim 13, wherein the Lewis acid comprises at least one of diethylaluminum ethoxide, polymethylsilsesquiloxane, diethyl zinc, titanium diisopropoxide, polydiethoxysiloxane, or polymethylhydridosiloxane.

15. The method of claim 13, wherein the Lewis acid comprises at least one of diethylene glycol, dimethyl ether, diethyl ether, tetrahydrofuran, pyridine, acetonitrile, tetramethylethylenediamine, or tris(pentafluorophenyl)borane.

16. The method of claim 1, wherein the metal oxide layer comprises at least one of $SnO_x$,$InZnO_x$, or $SiO_x$.

17. A method comprising:

providing an organometallic solution, the organometallic solution including an organometallic compound dissolved in a complexing solvent;

distributing the organometallic solution on a solid substrate at about ambient atmospheric pressure;

removing the complexing solvent at a temperature of 225° C. or less;

curing the organometallic compound to form a metallic oxide from the organometallic compound, wherein the metallic oxide forms a first metal oxide layer on the solid substrate at a temperature of 225° C. or less;

producing a first organic polymer layer on the first metal oxide layer by a first liquid coating process, the first liquid coating process comprising:

providing an organic polymer solution, the organic polymer solution including an organic polymer dissolved in a solvent;

distributing the organic polymer solution on the first metal oxide layer about ambient atmospheric pressure; and removing the solvent;

distributing the organometallic solution on the first organic polymer layer at about ambient atmospheric pressure;

curing the organometallic compound to form a metallic oxide from the organometallic compound, wherein the metallic oxide forms a second metal oxide layer on the first organic polymer layer at a temperature of 225° or less; and producing a second organic polymer layer on the second metal oxide layer by the first liquid coating process, wherein the distributing of the organometallic solution is by a second liquid coating process.

18. A method comprising:

providing a solution, the solution including an organometallic compound dissolved in a complexing solvent, and less than 1000 ppm water;

distributing the solution on a flexible solid substrate at a process pressure of greater than 475 mb;

removing the complexing solvent;

curing the organometallic compound to form a metallic oxide from the organometallic compound, wherein the metallic oxide forms a metal oxide layer on the solid substrate;

producing an organic polymer layer on the metal oxide layer by a first liquid coating process, the first liquid coating process including:

providing an organic polymer solution, the organic polymer solution including an organic polymer dissolved in a solvent;

distributing the organic polymer solution on the metal oxide layer at a process pressure of greater than 475 mb; and removing the solvent, wherein the distributing of the solution including an organometallic compound dissolved in a complexing solvent is by a second liquid coating process.

19. A method comprising:

producing an inorganic oxide layer on a solid substrate by a first liquid coating process, the first liquid coating process comprises applying an organometallic solution that includes an organometallic compound dissolved in a complexing agent, followed by curing of the organometallic compound to form a metallic oxide from the organometallic compound, wherein the metallic oxide forms the inorganic oxide layer having a thickness of 200 nm or less; and producing an organic polymer layer on the inorganic oxide layer by a second liquid coating process at a process pressure greater than 9.4 mb.

20. The method of claim 19, wherein the organometallic solution comprises a reactive organosilicon compound and curing results from removing the complexing agent.

21. The method of claim 20, wherein:

the inorganic oxide layer comprises $SiO_x$;

the applying, the curing, and the producing are performed at about ambient atmospheric pressure.

22. A method comprising:

producing an $SiO_x$ layer on a solid substrate by a first liquid coating process, the solid substrate being capable of bending 90° around a curve having a radius of 3.0 inches or less at 20° C. without apparent fracturing, the $SiO_x$ layer having a thickness of 200 nm or less, and the first liquid coating process including:

providing a first blend, the first blend including a first complexing solvent combined with a first organosilicon compound;

distributing the first blend on the solid substrate at about ambient atmospheric pressure;

forming a first inorganic oxide layer comprising the $SiO_x$ layer by curing the first organosilicon compound by removing the first complexing solvent;

producing a first organic polymer layer on the $SiO_x$ layer by a second liquid coating process, the second liquid coating process including:

providing a first organic polymer solution, the first organic polymer solution including a first organic polymer dissolved in a first solvent;

distributing the first organic polymer solution on the $SiO_x$ layer at about ambient atmospheric pressure;

forming a second inorganic oxide layer on the first organic polymer layer by a third liquid coating process, the third liquid coating process including:

providing a second blend, the second blend including a second complexing solvent combined with a second organosilicon compound or an organometallic compound;

distributing the second blend on the first organic polymer layer at about ambient atmospheric pressure, wherein the second inorganic oxide layer comprises either a second $SiO_x$ layer or a non-$SiO_x$ metal oxide layer, formed by curing either the second organosilicon or the organometallic compound by removing the second complexing solvent;

producing a second organic polymer layer on the second inorganic oxide layer by a fourth liquid coating process, the fourth liquid coating process including:

providing a second organic polymer solution, the second organic polymer solution including a second organic polymer dissolved in a second solvent; and distributing the second organic polymer solution on the second inorganic oxide layer at about ambient atmospheric pressure, wherein producing the second organic polymer layer on the second inorganic oxide layer is by a fourth liquid coating process.

* * * * *